Patented Apr. 11, 1939

2,153,993

UNITED STATES PATENT OFFICE 2,153,993

PROCESS OF PRODUCING N-VINYL COMPOUNDS

Walter Reppe, Ernst Keyssner, and Fritz Nicolai, Ludwigshafen-on-the-Rhine, Germany, assignors to I. G. Farbenindustrie Aktiengesellschaft, Frankfort-on-the-Main, Germany No Drawing. Application December 9, 1936, Serial No. 114,975. In Germany December 18, 1935

2 Claims. (Cl. 260—313)

The present invention relates to a process of producing N-vinyl compounds.

U. S. Patent 2,066,160 to Reppe et al. describes a process of producing N-vinyl compounds according to which acetylene is caused to act at temperatures above 100° C. on pyrrole compounds, i. e. pyrrole or organic compounds containing the pyrrole ring in the presence of an alkali metal or an alkali metal hydroxide or alcoholate.

We have now found that the said N-vinyl compounds can be obtained, also in good yields, by causing organic compounds to act in admixture with hydroxides of the alkali or alkaline earth metals or with the alkali compounds of the said substances in the presence of inert solvents or suspension agents at temperatures above 100° C. on vinyl halides or dihalogen derivatives of ethane such as ethylene or ethylidene halides.

As compounds containing the pyrrole ring besides pyrrole itself may be mentioned for example indole, carbazole and naphthocarbazole. The compounds obtainable from the said compounds by the addition of hydrogen or by the introduction of other atoms or atomic groups may be employed provided that they still contain a free NH-group.

As inert solvents or suspension agents suitable for the present process may be mentioned alcohols, as for example methyl, ethyl or butyl alcohol, glycols, as for example ethylene glycol or diethylene glycol, or hydrocarbons, as for example cechlohexane, benzene, toluene, tetrahydronaphthalene or decahydronaphtalene. Solid compounds, such as carbazole, are preferably made into a paste with a diluent of the said kind.

The reaction proceeds most favorably between 100° and 200° C.

The vinyl compounds obtained may be separated from the alkaline substances and salts formed in the reaction and purified by distillation, if desired under reduced pressure, by extraction with suitable solvents or by crystallization.

The following example will further illustrate how the present invention may be carried out in practice but the invention is not restricted to this example. The parts are by weight.

Example

Equimolecular amounts of carbazole and potassium hydroxide together with three times the amount of methylnaphthalene are heated to the boiling point of the methylnaphthalene while stirring vigorously. The formation of potassium carbazole commences at about 180° C. with the splitting off of water which distils off together with the methylnaphthalene. As soon as the methylnaphthalene passing over is clear, the formation of potassium carbazole is completed.

The resulting potassium carbazole is filtered while excluding air and washed with hexahydroxylene, 60 parts of the potassium carbazole are charged into a pressure-tight vessel and 50 parts of hexahydroxylene are added. After expelling the air from the vessel by means of nitrogen, 16 parts of vinyl chloride are introduced. The whole is then heated to from 180° to 190° C. while shaking until the pressure, which temporarily increases to about 20 atmospheres, remains constant at about 8 atmospheres.

The reaction mixture is freed from simultaneously formed potassium chloride by filtration and subjected to fractional distillation. After the hexahydroxylene has passed over, the vinylcarbazole formed passes over at from 140° to 150° C. under a pressure of 1 millimeter (mercury gauge).

Instead of carbazole the above mentioned other pyrrole compounds can be employed in a similar manner. When starting from ethylene or ethylidene halides preferably the double amount of alkalies is employed.

What we claim is:

1. A process of producing N-vinyl compounds which comprises causing a pyrrole compound selected from the class consisting of pyrroles, indoles, carbazoles and naphtho-carbazoles having a free NH-group in admixture with a substance of the group consisting of hydroxides and alcoholates of the alkali and alkaline earth metals and the alkali compounds of said pyrrole compounds to act in a closed vessel on a substance of the group consisting of vinyl halides and dihalogen derivatives of ethane in the presence of an inert diluent at temperatures above 100° C.

2. A process of producing N-vinyl compounds which comprises causing a pyrrole compound selected from the class consisting of pyrroles, indoles, carbazoles and naphtho-carbazoles, having a free NH-group in admixture with a substance of the group consisting of hydroxides and alcoholates of the alkali and alkaline earth metals and the alkali compounds of said pyrrole compounds to act in a closed vessel on a substance of the group consisting of vinyl halides and dihalogen derivatives of ethane in the presence of an inert diluent at temperatures between 100 and 200° C.

WALTER REPPE.
ERNST KEYSSNER.
FRITZ NICOLAI.